May 20, 1958  B. KAZAN  2,835,779
AUTOMATIC HEATING AND COOLING CONTROL
Filed June 3, 1954

INVENTOR.
Benjamin Kazan
BY *Morris L. Rabin*
ATTORNEY

United States Patent Office 2,835,779
Patented May 20, 1958

2,835,779

AUTOMATIC HEATING AND COOLING CONTROL

Benjamin Kazan, Princeton, N. J., assignor, by mesne assignments, to Whirlpool Corporation, a corporation of Delaware Application June 3, 1954, Serial No. 434,295

4 Claims. (Cl. 219—20)

This invention relates to automatic regulation of heating and cooling systems, and, more particularly, to a novel method and apparatus for automatically regulating a heating or cooling system to maintain a comfort-level temperature.

The ordinary thermostat controlling a temperature-conditioning system for heating or cooling a room is sensitive substantially only to air temperature. The temperature of the air within the room is, however, only one of many factors determining whether a living human occupying the room is comfortable. The living human body is made comfortable when the excess heat generated by the life processes are thrown off exactly as fast as generated. If the temperature of the surroundings is too high, body heat is lost too slowly and the occupant feels uncomfortably warm. If the temperature is too low, the occupant loses body heat too fast and feels chilly.

Another factor in maintaining the human body in a comfortable condition is the rate at which moisture is evaporated from the skin. This is determined by the relative humidity of the air as well as its temperature. The heat given off from the body by evaporation of moisture from the skin is called latent heat, and the heat given off by the various heat trnsfer processes is called sensible heat.

Various tests have been conducted to determine what conditions of temperature, humidity and air motion are most conducive to comfort and health. As a result, comfort charts have been worked out which indicate zones of comfortable temperature within various ranges of relative humidity. In this specification a direct means for controlling the relative humidity of the air is not discussed. Improved regulation of a temperature-conditioning system, however, may inherently maintain relative humidities at favorable levels.

Experiments have indicated that the body of a living human at rest, at temperatures near the comfort level, dissipates body heat chiefly and almost equally by convection and by radiation. Convective heat loss occurs through the action of air moving over the body and absorbing and carrying away heat by direct contact. Heat is lost from the body by direct radiation to the surrounding walls without warming the intervening air. This radiant heat transfer phenomenon is very similar to light radiation. Heat radiation takes place through a vacuum, through gases and through some liquids and solids. One body absorbs radiation emitted by another depending upon the temperature, surface area, surface finish and relative positions in space of the bodies. Mean radiant temperature or radiant temperature is herein used as an expression which takes all these factors into consideration.

Heretofore thermostats controlling temperature-conditioning systems have been sensitive only to the temperature of the air. They have, therefore, only taken into consideration the heat which is being lost to the body through the convection process. As the outdoor temperature and position of the sun vary, the temperature of the walls of the enclosure or room, particularly the outside walls, vary. The rate at which the occupant loses heat by means of the radiant heat transfer process, therefore, varies with the outdoor temperature and the position of the sun. The winter room-air temperature is, therefore, maintained higher than the summer room-air temperature to maintain an occupant in a comfortable condition.

Whether a convection or radiant conditioning system is used, the radiant heat transferred to or from the panels of the room is a factor in maintaining occupants at a comfortable temperature. This invention provides a system of regulation which takes in account the radiant temperature of the panels of the enclosure as well as room-air temperature.

An object of this invention is to provide a novel method and novel apparatus for controlling a temperature-conditioning system to maintain a comfort-level temperature.

Another object is to provide a regulator sensitive to convective and radiant heat transfer for controlling a temperature-conditioning system to maintain a comfort-level temperature.

A further object is to provide a novel method and apparatus for regulating a conditioning system which is sensitive to room-air temperature and to the radiant temperature of the panels of the room.

In accordance with this invention, the temperature of the air within the room and the rate of body radiation heat transferred to or from the room panels are measured by an element which is sensitive to the air temperature as well as to the rate at which radiation heat is transferred to or from the surrounding panels. A signal is derived in accordance with the combined effect of the air temperature and the radiant heat transfer rate of the panels of the enclosure. This signal is applied to vary the rate of operation of the conditioning system. A device which derives this signal in accordance with the air temperature and radiant temperature of the panels may be, for example, a blackened metal plate. The plate assumes a temperature determined by the radiant heat transferred to or from the room panels. The temperature of the plate is also affected to a predetermined extent by the temperature of the air. This extent is determined by the degree of insulation from the air.

A thermostatic unit of any well known type such as, for example, a bimetallic strip operated unit is mounted in thermal contact with this metal plate. The thermostatic unit operates in response to the plate temperature which is dependent upon both the air temperature and the radiant temperature of the panels.

Other objects and advantages of the present invention will become apparent to one skilled in the art from a reading of the following specification in conjunction with the accompanying drawings of illustrative examples constructed according to the teachings of the present invention, in which.

Figure 1:
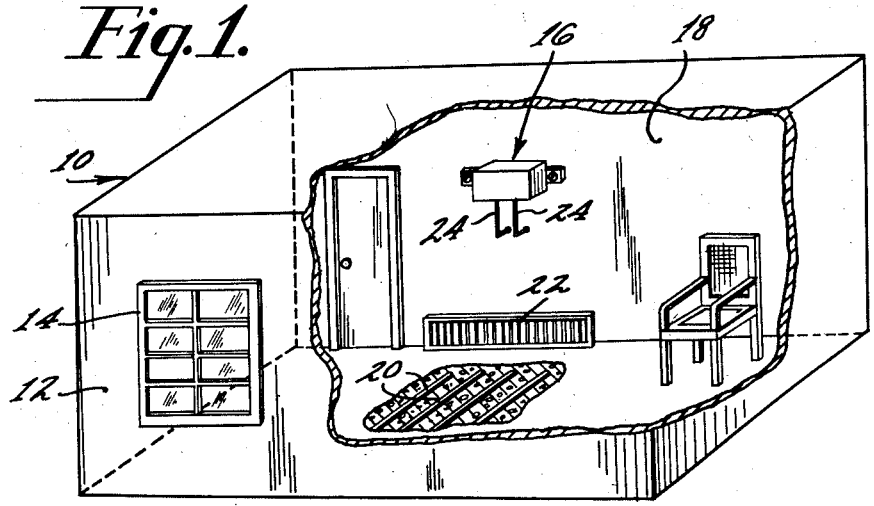
Fig. 1 is a perspective view of a living compartment with a portion of its walls broken away having an illustrative temperature regulator mounted therein.

In Fig. 1 is shown an illustrative living compartment 10. For the purpose of this specification, only the wall 12 having a window 14 will be considered to be an outside wall. The room is enclosed by six panels including 4 walls, a floor and a ceiling. The enclosure 10 is a single room of a larger house. The wall 12, therefore, forms part of one of its outside walls. Regulator 16 sensitive to the temperature of the air and panels is shown mounted on the wall 18 of the enclosure. It is mounted in a position where it is in good radiant energy exchange relationship with the outside wall. For example, it is mounted on the wall 18 directly opposite the outside wall 12.

A temperature-conditioning system of any well known heating and cooling type is associated with the room. It may heat or cool the room in a number of separate ways. It may, for example, be a water system having pipes 20 embedded in a concrete floor and other pipes not shown behind the slotted grating 22. The water pipes within the concrete floor provide a radiant heating or cooling panel while the slotted grating 22 allows room air to pass directly over the pipes to be heated or cooled by convection. These pipes may carry a hot or cold fluid. They may carry, for example, cold water during the warmer months to cool occupants of the room and hot water during the cooler months to heat them. Wires 24 pass from the regulator 16 through the wall 18 to be led to the control mechanism (not shown) of the temperature conditioning system. The regulator 16 supplies a signal to the control mechanism of the conditioning system which operates the system at a rate which is determined by the radiant temperature of the panels as well as the air temperature.

Figure 2:
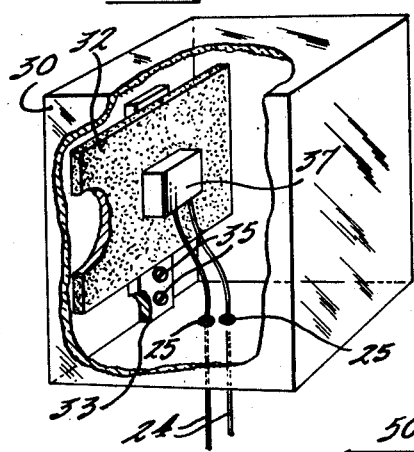
Fig. 2 is a perspective view of an illustrative temperature regulator with a portion of its enclosing case broken away to show its interior construction.

In Fig. 2 is shown in detail the regulator 16. The regulator is mounted within a casing or enclosure 30 whose walls are entirely or partially transparent to radiant heat waves. The walls may, for example, be glass or plastic transparent to heat radiation. The ability of the walls to transmit radiant heat is, therefore, relatively high. A plate 32 is mounted within the enclosure and is insulated from the casing wall. It is insulated in this illustrative embodiment by being mounted on a strip 33 of heat insulating material which is secured to the casing 30 by means of screws 35. The strip 33, for example, may be made of an asbestos composition.

The plate 32 is made of a material and in a form that will make it a relatively good radiator of heat energy. For example, the plate 32 may be metal. A thermostatic element 37 is mounted in thermal exchange contact with the plate 32. This thermostatic element may be of the well known bimetallic type. It may be, for example, a two-wire thermostatic control of the type shown on p. 62, Fig. 4–21, of Automatic Control of Heating and Air Conditioning by Haines (first edition published in 1953).

The two wires 24 pass through sealed holes 25 in casing 30 and are connected to the control mechanism of the temperature-conditioning system associated with the room. The control mechanism may be any of the well known types of controls actuated by a thermostatic element to control the rate of operation of the conditioning system. It may, for example, be a system including a two-wire thermostat as shown in Fig. 8–7 on p. 221 of the aforementioned publication by Haines.

The metal plate 32 is sensitive to heat radiation transferred to or from the surrounding walls of the enclosure and may absorb such radiated heat or transfer heat by radiation. If all the casing walls are transparent to radiant energy, the plate will exchange radiant energy with all of the panels of the enclosure. It is directly opposed to the outside wall 12 and to the inside wall 18 to which it is mounted. The rate of energy absorption by the plate may, therefore, be substantially dependent upon the mean radiant temperature of walls 12 and 18.

The amount of radiation exchanged with these walls, as well as the other panels of the room, therefore, determines to some extent the temperature of the plate. The temperature of the plate will also be affected by convective heat exchange with the air surrounding the casing. The degree of evacuation of the casing determines the rate of heat exchange with the air by the convection process. The factors affecting the radiant characteristics of the plate and the degree of evacuation insulating the plate from the surrounding air may be arbitrarily fixed. This predetermines the relative effect of radiant heat exchange and convective heat exchange upon the plate 32.

The device may be, for example, designed so that the ratio of radiant heat exchange to convective heat exchange approximates that possessed by the human body.

On a very cool winter day when the temperature of the panels of the room, particularly the outside wall, drops very low; the radiant heat absorbed from the plate increases. This lowers the temperature of the plate to cause the thermostatic element 37 to signal the control mechanism to operate the heating system at a higher rate. The regulator, therefore, maintains a temperature in accordance with the outdoor temperature as well as the inside temperature of the room. If a radiant heating system is installed, the temperature regulator takes direct cognizance of its wall-warming effect in reducing the air temperature required to maintain a comfort temperature.

During the hot summer days when the temperature of the walls 12 and 18 and other panels rises, especially when exposed to direct sunlight, the radiant heat absorbed by the walls 12 and 18 and panels from the plate 32 decreases. The radiant temperature of the room panels may even rise sufficiently to cause a transfer of radiant heat therefrom to the plate 32. The temperature of the plate 32, therefore, increases to signal the conditioning system to increase its cooling rate. The radiation sensitive feature of the invention is, therefore, useful during the summer particularly in rooms with sun exposures.

Figure 3:
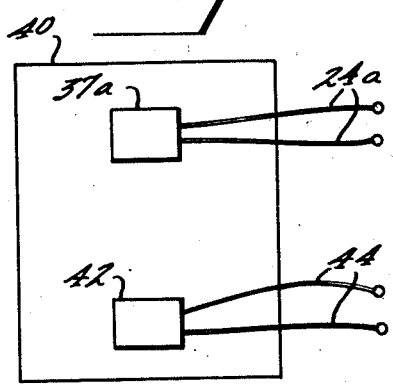
Fig. 3 is a plan view of a radiation sensitive plate which may be used in another illustrative embodiment.

In Fig. 3 is shown a radiant plate 40 which may be used instead of the plate 32 shown in Fig. 2. Parts shown in Fig. 3 identical to parts shown in Fig. 2 have the same reference character including the suffix "a." It may be mounted in a similar manner within a transparent case as shown in Fig. 2. Its surface may be blackened to improve its radiating characteristics. A thermostatic unit 37a identical to the unit shown in Fig. 2 is mounted on the plate. Wires 24a connect the thermostatic unit to the control mechanism of a temperature conditioning system. At the other end of the plate an electrical heating unit 42 is connected by wires 44 to a source of electrical current. The heating unit, for example, may contain coils of Nichrome wire. The heating unit may be controlled, for example, by any well known temperature regulating means such as a bimetallic strip to supply sensible heat at a temperature of substantially 98 degrees F. This temperature roughly corresponds to body temperature. The factors affecting the radiating and convective heat exchange properties of the plate are adjusted to give the plate substantially the same heat exchange characteristics as that possessed by the living human body. The plate, therefore, loses heat by radiation and convection in the same ratio as that lost by the human body. The thermostatic unit 37a is experimentally adjusted to maintain a comfort-level temperature in the room regardless of outdoor temperature. An initial setting of the thermostatic unit 37a maintains a comfort-level temperature regardless of variations in outdoor temperature.

Figure 4:
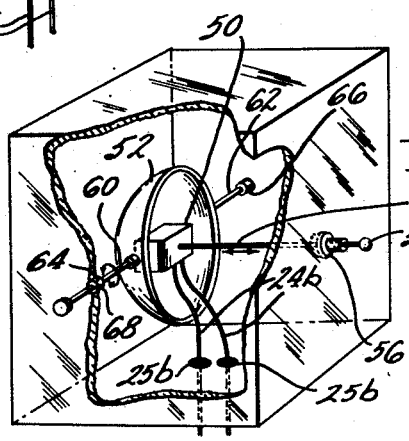
Fig. 4 is a perspective view of still another illustrative embodiment with a portion of its casing broken away to show details of its interior construction.

In Fig. 4 is shown a regulator which is similar in many respects to the regulator shown in Fig. 2. Parts in Fig. 4 identical to parts in Fig. 2 have the same reference character including the suffix "b." A radiation exchanging box 50 which, for example, may be made of copper whose outer surfaces are blackened to improve their radiating characteristics, is shown mounted at the focal point of a radiant heat reflecting surface 52. These elements are mounted within a transparent casing 30b similar to the casing described in Fig. 2. The radiating box is mounted on an insulated sliding rod 54. This rod is mounted to slide within an insulating bushing 56 attached to a wall of the transparent casing. The rod and bushing, for example, may be made of a heat insulating plastic such as Micarta. A knob 58 is provided on the external end of the casing to provide a means for varying the horizontal position of the box. The reflecting surface may be constructed in a spherical form to concentrate rays radiating from the surrounding walls on the radiating box. The reflecting surface may be a silvered and polished mirror. The radiating box may include, for example, the plate and thermostatic unit shown in Fig. 2, or the plate and units shown in Fig. 3, or any equivalent device. Wires 24b pass from the box through the casing wall through sealed holes 25b. The interior of the casing is evacuated in the manner described in connection with Fig. 2. The reflecting surface 52 is secured to shafts 60 and 62 at points diametrically opposed. The shafts are pivoted in bearings 64 and 66 mounted in the transparent walls of the casing. The shafts 60 and 62 may be made of an insulating material, such as Micarta, to insulate the reflector from the outer air. The shaft 60 passes completely through the transparent wall through hole 68. This hole is sealed to maintain the required vacuum within the casing. A seal of the O-ring type, for example, may be used to maintain the vacuum.

The reflector concentrates the heatrays radiating from the walls of the enclosure on the radiation-sensitive box. The sliding rod 54 provides a means for moving the blackened radiation-sensitive box in and out of the focal point of the reflecting surface. A means is thereby provided for varying the radiant heat transfer characteristics of the box in comparison to its convective heat transfer characteristics. The rod may be set by experiment to a point which provides, over a range of outdoor temperatures, a regulation that is most comfortable with respect to the human body.

The reflecting surface may be rotated by means of knob 86 and shafts 60 and 62 through a plane of rotation. This enables the reflector to be directed to any preselected portion of the room for receiving and reflecting radiations. This also enables the device to be set at a position providing a ratio of radiant heat transfer rate in comparison to convective heat transfer rate that approximates the conditions necessary to provide a comfort temperature for the living human body.

A method of regulating a control mechanism of a conditioning system to maintain a comfort-level temperature has been herein shown and described. Various apparatus for carrying out this method also have been generally and specifically shown and described.

What is claimed is:

1. An automatic control for heating and cooling systems in an enclosure having walls, comprising a housing transparent to heat radiation, a heat conducting metal plate supported by a heat insulator in said housing and having a blackened surface to increase its radiation absorption, a thermostatic element in heat conduction with said plate, and having electric switch means adapted to be closed at a predetermined temperature of said plate, the temperature of the plate varying according to radiation absorbed by it on the walls of said enclosure and from the air in said enclosure, to control said system responsive to outside temperature as indicated by wall radiation and to inside temperature of the air, said plate forming part of a casing enclosing said thermostat, and said casing being blackened and located substantially at the focal center of a concave reflecting member to gather radiation and concentrate it on the casing to secure a stronger response from radiation.

2. An automatic control for heating and cooling systems in an enclosure having walls, comprising a housing transparent to heat radiation, a heat conducting metal plate supported by a heat insulator in said housing and having a blackened surface to increase its radiation absorption, a thermostatic element in heat conduction with said plate, and having electric switch means adapted to be closed at a predetermined temperature of said plate, the temperature of the plate varying according to radiation absorbed by it on the walls of said enclosure and from the air in said enclosure, to control said system responsive to outside temperature as indicated by wall radiation and to inside temperature of the air, said plate also having an electrical heating unit in heat conducting engagement with said plate and controlled by a thermostatic switch to maintain a plate temperature at one point substantially equal to human body temperature, said first-mentioned thermostatic element being spaced on said plate from said point and adjusted to maintain body comfort in said enclosure at various outside temperatures.

3. An automatic control for heating and cooling systems in an enclosure having walls, comprising a housing transparent to heat radiation, a heat conducting metal plate supported by a heat insulator in said housing and having a blackened surface to increase its radiation absorption, a thermostatic element in heat conduction with said plate, and having electric switch means adapted to be closed at a predetermined temperature of said plate, the temperature of the plate varying according to radiation absorbed by it on the walls of said enclosure, to control said system responsive to outside temperature as indicated by wall radiation, said housing being evacuated to make the thermostat on said plate responsive only to radiation impinging on the plate, said plate forming part of a casing enclosing said thermostat, and said casing being blackened and located substantially at the focal center of a concave reflecting member to gather radiation and concentrate it on the casing to secure a stronger response from radiation.

4. An automatic control for heating and cooling systems in an enclosure having walls, comprising a housing transparent to heat radiation, a heat conducting metal plate supported by a heat insulator in said housing and having a blackened surface to increase its radiation absorption, a thermostatic element in heat conduction with said plate, and having electric switch means adapted to be closed at a predetermined temperature of said plate, the temperature of the plate varying according to radiation absorbed by it on the walls of said enclosure, to control said system responsive to outside temperature as indicated by wall radiation, said housing being evacuated to make the thermostat on said plate responsive only to radiation impinging on the plate, said plate also having an electrical heating unit in heat conducting engagement with said plate and controlled by a thermostatic switch to maintain a plate temperature at one point substantially equal to human body temperature, said first-mentioned thermostatic element being spaced on said plate from said point and adjusted to maintain body comfort in said enclosure at various outside temperatures.

References Cited in the file of this patent

UNITED STATES PATENTS

| | | |
|---|---|---|
| 1,700,661 | Appelberg | Jan. 29, 1929 |
| 1,991,152 | Hickman | Feb. 12, 1935 |
| 1,995,355 | Koerner | Mar. 26, 1935 |
| 2,012,285 | Otis | Aug. 27, 1935 |
| 2,032,041 | Beck | Feb. 25, 1936 |
| 2,063,997 | Godsey | Dec. 15, 1936 |
| 2,083,317 | Dallenbach | June 8, 1937 |
| 2,124,633 | Robinson | July 26, 1938 |
| 2,300,092 | Baum | Oct. 27, 1942 |
| 2,556,065 | Callender | June 5, 1951 |
| 2,557,906 | Callender | June 19, 1951 |
| 2,649,530 | Dietz | Aug. 18, 1953 |
| 2,686,043 | Smith et al. | Aug. 10, 1954 |